(12) United States Patent
Shinohara et al.

(10) Patent No.: US 8,080,309 B2
(45) Date of Patent: Dec. 20, 2011

(54) COATING COMPOSITION, ITS COATING FILM, ANTIREFLECTION FILM, AND IMAGE DISPLAY DEVICE

(75) Inventors: Seiji Shinohara, Shinjuku-Ku (JP); Takahiro Niimi, Shinjuku-Ku (JP); Toshio Yoshihara, Shinjuku-Ku (JP)

(73) Assignee: Dai Nippon Printing Co., Ltd., Shinjuku-ku (JP)

( * ) Notice: Subject to any disclaimer, the term of this patent is extended or adjusted under 35 U.S.C. 154(b) by 999 days.

(21) Appl. No.: 10/591,888

(22) PCT Filed: Mar. 3, 2005

(86) PCT No.: PCT/JP2005/003579
§ 371 (c)(1),
(2), (4) Date: Nov. 14, 2007

(87) PCT Pub. No.: WO2005/087884
PCT Pub. Date: Sep. 22, 2005

(65) Prior Publication Data
US 2008/0187732 A1    Aug. 7, 2008

(30) Foreign Application Priority Data

Mar. 12, 2004 (JP) ................................. 2004-071591

(51) Int. Cl.
*B32B 7/02* (2006.01)
(52) U.S. Cl. ........ 428/212; 428/375; 428/402; 428/403; 428/405; 428/407; 502/349; 502/350; 502/351; 502/352
(58) Field of Classification Search .................. 428/212, 428/375, 402, 403, 405, 407; 502/349, 350, 502/351, 352
See application file for complete search history.

(56) References Cited

U.S. PATENT DOCUMENTS

| | | | | |
|---|---|---|---|---|
| 6,210,858 | B1 * | 4/2001 | Yasuda et al. | 430/270.1 |
| 6,949,284 | B2 * | 9/2005 | Yoshihara et al. | 428/212 |
| 7,531,234 | B2 | 5/2009 | Nakamura et al. | |
| 2005/0175796 | A1 | 8/2005 | Nakamura et al. | |

FOREIGN PATENT DOCUMENTS

| | | |
|---|---|---|
| JP | 2001-166104 | 6/2001 |
| JP | 2002-275430 | 9/2002 |
| JP | 2002-371236 A1 | 12/2002 |
| JP | 2004-029705 A1 | 1/2004 |
| JP | 2004-191873 A1 | 7/2004 |
| JP | 2004-249495 A1 | 9/2004 |
| WO | WO 03/093878 A2 | 11/2003 |

OTHER PUBLICATIONS

Japanese Office Action dated Aug. 12, 2011 (with English Translation).

* cited by examiner

*Primary Examiner* — David Sample
*Assistant Examiner* — Lawrence Ferguson
(74) *Attorney, Agent, or Firm* — Burr & Brown

(57) ABSTRACT

A coating composition forms a coating film having an eliminated or reduced photocatalytic action-derived deterioration, and forms a coating film having a lowered haze value, excellent dispersibility and dispersion stability in a coating liquid form, excellent storage stability, and also excellent coatability. The coating composition includes at least the following four components: titanium dioxide fine particles with eliminated or reduced photocatalytic activity which is obtained by surface treating titanium dioxide fine particles doped with cobalt capable of capturing free electrons and/or holes, with a zinc chelate compound capable of capturing free electrons and/or holes; a binder component; a dispersant; and an organic solvent.

17 Claims, 3 Drawing Sheets

COATING COMPOSITION, ITS COATING FILM, ANTIREFLECTION FILM, AND IMAGE DISPLAY DEVICE

FIELD OF THE INVENTION

The present invention relates to a coating composition having excellent dispersibility, dispersion stability, and coatability, and a coating film formed using the coating composition. More specifically, the present invention relates to a coating composition having improved lightfastness that is suitable for the formation of a layer for constituting an antireflective film for covering the display surface of LCDs, CRTs and the like, particularly a medium- to high-refractive index layer, an antireflective film comprising a layer of a coating film formed using the coating composition, and an image display device onto which the antireflective film has been applied.

BACKGROUND OF THE INVENTION

Low reflection of light from an external light source such as a fluorescent lamp is required of the display surface of image display devices such as liquid crystal displays (LCDs), cathode-ray tube display devices (CRTs) and the like from the viewpoint of enhancing the visibility.

It has hitherto been known that covering the surface of a transparent object with a transparent film having a low refractive index reduces the reflectance. The visibility can be improved by providing an antireflective film utilizing this phenomenon on the display surface of an image display device. The layer construction of the antireflective film is provided by forming a high-refractive index layer or a medium-refractive index layer on a surface which should prevent reflection, and further forming a low-refractive index layer on the high-refractive index layer or the medium-refractive index layer.

Methods for the formation of the high-refractive index layer or medium-refractive index layer in the antireflective film are generally classified roughly into gas phase methods and coating methods. Gas phase methods include physical methods such as vacuum deposition and sputtering and chemical methods such as CVD. Coating methods include roll coating, gravure coating, slide coating, spray coating, dip coating, and screen printing.

The gas phase method can form thin-film high-refractive index layer and medium-refractive index layer having high function and high quality, but on the other hand, the gas phase method is disadvantageous in that close control of atmosphere in a high vacuum system is necessary and, at the same time, a special heating device or an ion generation accelerator is necessary and, consequently, a complicated and increased-size production apparatus is necessary, necessarily leading to increased production cost. Further, the formation of a large-area thin film as the high-refractive index layer and medium-refractive index layer or the formation of a thin film having even thickness on the surface of films or the like having a complicated shape is difficult.

On the other hand, among the coating methods, the spray method is disadvantageous, for example, in that the utilization efficiency of the coating liquid is poor and the control of film formation conditions is difficult. Roll coating, gravure coating, slide coating, dip coating, screen printing and the like have good utilization efficiency of the film forming material and are advantageous in terms of mass production and equipment cost. In general, however, the high-refractive index layer and medium-refractive index layer formed by the coating method are disadvantageously inferior to those formed by the gas phase method in function and quality.

A method comprising coating a coating liquid comprising high-refractive index fine particles of titanium oxide, tin oxide or the like dispersed in a solution of a binder of an organic material onto a substrate to from a coating film has recently been proposed as a coating method that can form thin-film high-refractive index layer and medium-refractive index layer having excellent quality.

Patent document 1 describes that, in the formation of a coating film having a low refractive index, a coating composition containing rutile-type titanium oxide treated with an inorganic compound is excellent in dispersibility, dispersion stability, and evenness of coating and can easily form an even large-area thin film. The coating film formed using the coating composition described in patent document 1, however, had unsatisfactory lightfastness.

Patent document 2 discloses that a coating composition containing a rutile-type titanium oxide treated with an inorganic compound is used for providing an antireflective film suitable for mass production. The coating film formed using the coating composition disclosed in patent document 2, however, had unsatisfactory lightfastness.

Patent document 3 discloses that, in order to form an antireflective coating film having improved lightfastness, a metal oxide treated with a zinc chelate compound is incorporated in the coating composition. Even for the coating film formed using the coating composition disclosed in patent document 3, the lightfastness was still unsatisfactory.

[Patent document 1] Japanese Patent Laid-Open No. 275430/2002
[Patent document 2] Japanese Patent Laid-Open No. 166104/2001
[Patent document 3] Japanese Patent Laid-Open No. 371236/2002

SUMMARY OF THE INVENTION

The metal oxide fine particles having a high refractive index for use in the formation of a medium- to high-refractive index layer generally have photocatalytic activity and disadvantageously deteriorates the coating film. Accordingly, lightfastness properties are required of the coating film constituting the high-refractive index layer and the coating film constituting the medium-refractive index layer.

The coating film constituting the medium- to high-refractive index layer should be transparent to a visible light region. Regarding the high-refractive index metal oxide fine particles for use in the formation of the medium- to high-refractive index layer, the so-called ultrafine particles having a primary particle diameter equal to or smaller than the wavelength of visible light should be used and, at the same time, the metal oxide fine particles should be homogeneously dispersed in the coating liquid and coating film.

In general, as the particle diameter of the fine particles decreases, the surface area of the fine particles increases and the cohesion between the fine particles increases. When the solid component in the coating liquid is aggregated, the haze value of the coating film is increased. Accordingly, dispersibility high enough to form an even coating film having a low haze value is required of the coating liquid for the formation of a thin film for constituting the high-refractive index layer and a thin film for constituting the medium-refractive index layer.

Further, dispersion stability high enough to realize storage for a long period of time is required of the coating liquid.

Furthermore, in order to easily form a large-area thin film from the viewpoint of mass production, the coatability of the coating liquid should be such that the coating liquid can be evenly and thinly coated and can form a coating which does not cause uneven drying.

In view of the above technical demand, the present invention provides a coating composition, which can form a coating film having an eliminated or reduced photocatalytic action-derived deterioration and can form a coating film having a lowered haze value, has excellent dispersibility and dispersion stability in a coating liquid form, has excellent storage stability, and also has excellent coatability, to provide a coating film, an antireflective film, and an antireflective film formed using the coating composition, and to provide an image display device having a display surface covered with the antireflective film.

The present invention can be attained by a first coating composition characterized by comprising at least the following four components (1) to (4): (1) titanium dioxide fine particles with eliminated or reduced photocatalytic activity which is obtained by surface-treating titanium dioxide fine particles doped with cobalt capable of capturing free electrons and/or holes, with an organometal compound of zinc capable of capturing free electrons and/or holes, (2) a binder component, (3) a dispersant, and (4) an organic solvent.

According to the present invention, there is provided a second coating composition comprising the same components as the first coating composition according to the present invention, except that the following metal oxide fine particles are adopted instead of the titanium dioxide fine particles having eliminated or reduced photocatalytic activity as component (1) in the first coating composition. That is, in the second coating composition, the binder component, the dispersant, and the organic solvent are the same as those in the first coating composition. The titanium dioxide fine particles used in the second coating composition according to the present invention are titanium dioxide fine particles with eliminated or reduced photocatalytic activity which is obtained by surface-treating titanium dioxide fine particles doped with cobalt capable of capturing free electrons and/or holes, with an organometal compound of zinc capable of capturing free electrons and/or holes, and further coating the surface treated titanium dioxide fine particles with anionic polar group-containing organic compound and/or organometal compound.

According to the present invention, there is provided a third coating composition comprising the same components as the first coating composition according to the present invention, except that the following metal oxide fine particles are adopted instead of the titanium dioxide fine particles having eliminated or reduced photocatalytic activity as component (1) in the first coating composition. That is, in the third coating composition, the binder component, the dispersant, and the organic solvent are the same as those in the first coating composition. The titanium dioxide fine particles used in the third coating composition according to the present invention are titanium dioxide fine particles with eliminated or reduced photocatalytic activity which is obtained by coating titanium dioxide fine particles doped with cobalt capable of capturing free electrons and/or holes, with an inorganic compound capable of reducing or eliminating photocatalytic activity, and further surface-treating the coated titanium dioxide fine particles with an organometal compound of zinc capable of capturing free electrons and/or holes.

According to the present invention, there is provided a fourth coating composition comprising the same components as the first coating composition according to the present invention, except that the following metal oxide fine particles are adopted instead of the titanium dioxide fine particles having eliminated or reduced photocatalytic activity as component (1) in the first coating composition. That is, in the fourth coating composition, the binder component, the dispersant, and the organic solvent are the same as those in the first coating composition. The titanium dioxide fine particles used in the fourth coating composition according to the present invention are titanium dioxide fine particles with eliminated or reduced photocatalytic activity which is obtained by coating titanium dioxide fine particles doped with cobalt capable of capturing free electrons and/or holes, with an inorganic compound capable of reducing or eliminating photocatalytic activity, further surface-treating the coated titanium dioxide fine particles with an organometal compound of zinc capable of capturing free electrons and/or holes, and further coating the surface treated titanium dioxide fine particles with anionic polar group-containing organic compound and/or organometal compound.

The coating film according to the present invention is characterized by being produced by coating the first, second, third, or fourth coating composition onto a surface of an object and curing the coating, wherein, when the thickness of the coating film after curing is 0.05 to 10 µm, said coating film has a refractive index of 1.55 to 2.20, and the haze value of the coating film as measured integrally with a base material according to JIS K 7361-1 is not different from or is different by not more than 1% from the haze value of said base material per se.

The first coating film according to the present invention is characterized by comprising an intimate mixture of (1) titanium dioxide fine particles with reduced photocatalytic activity which is obtained by surface treating titanium dioxide fine particles doped with cobalt capable of capturing free electrons and/or holes, with an organometal compound of Zn capable of capturing free electrons and/or holes and (2) a dispersant with (3) a cured binder, wherein, when the thickness of the coating film is 0.05 to 10 µm, said coating film has a refractive index of 1.55 to 2.20, and the haze value of the coating film as measured integrally with a base material according to JIS K 7361-1 is not different from the haze value of the base material per se, or is different by not more than 1% from the haze value of the base material per se.

The second coating film according to the present invention is characterized by comprising an intimate mixture of (1) titanium dioxide fine particles with eliminated or reduced photocatalytic activity, produced by surface treating titanium dioxide fine particles, which have been doped with cobalt capable of capturing free electrons and/or holes, with an organometal compound of zinc capable of capturing free electrons and/or holes, and further coating the surface treated titanium dioxide fine particles with anionic polar group-containing organic compound and/or organometal compound, and (2) a dispersant with (3) a cured binder, wherein, when the thickness of the coating film is 0.05 to 10 µm, said coating film has a refractive index of 1.55 to 2.20, and the haze value of the coating film as measured integrally with a base material according to JIS K 7361-1 is not different from the haze value of the base material per se, or is different by not more than 1% from the haze value of the base material per se.

The third coating film according to the present invention is characterized by comprising an intimate mixture of (1) titanium dioxide fine particles with eliminated or reduced photocatalytic activity which is obtained by coating titanium dioxide fine particles doped with cobalt capable of capturing free electrons and/or holes, with an inorganic compound capable of reducing or eliminating photocatalytic activity, and further surface-treating the coated titanium dioxide fine particles with an organometal compound of zinc capable of capturing free electrons and/or holes, and (2) a dispersant with (3) a cured binder, wherein, when the thickness of the coating film is 0.05 to 10 µm, said coating film has a refractive index of 1.55 to 2.20, and the haze value of the coating film as measured integrally with a base material according to JIS K 7361-1 is not different from the haze value of the base material per se, or is different by not more than 1% from the haze value of the base material per se.

The fourth coating film according to the present invention is characterized by comprising an intimate mixture of (1) titanium dioxide fine particles with reduced photocatalytic activity which is obtained by coating titanium dioxide fine particles doped with cobalt capable of capturing free electrons and/or holes, with an inorganic compound capable of reducing or eliminating photocatalytic activity, further surface-treating the coated titanium dioxide fine particles with an organometal compound of zinc capable of capturing free electrons and/or holes, and further coating the surface treated titanium dioxide fine particles with anionic polar group-containing organic compound and/or organometal compound, and (2) a dispersant with (3) a cured binder, wherein, when the thickness of the coating film is 0.05 to 10 µm, said coating film has a refractive index of 1.55 to 2.20, and the haze value of the coating film as measured integrally with a base material according to JIS K 7361-1 is not different from the haze value of the base material per se, or is different by not more than 1% from the haze value of the base material per se.

The coating film according to the present invention can constitute at least one layer of an antireflective film. The antireflective film is transparent to light and comprises two or more light-transparent layers different from each other in refractive index. The coating film according to the present invention can constitute at least one layer of the light-transparent layers.

The antireflective film according to the present invention is characterized by comprising a light-transparent base material film and
two or more light-transparent layers stacked on at least one side of the light-transparent base material film, said two or more light-transparent layers being transparent to light and being different from each other in refractive index, at least one of the light-transparent layers being the coating film according to the present invention.

The image display device according to the present invention is an image display device characterized by having a display surface covered with an antireflective film, the antireflective film being transparent to light and being a laminate of two or more light-transparent layers different from each other in refractive index, at least one of the light-transparent layers being the coating film according to the present invention.

EFFECT OF THE INVENTION

In the first, second, third or fourth coating composition according to the present invention, the titanium dioxide fine particles having photocatalytic activity have been doped with cobalt. By virtue of the property of cobalt that can capture free electrons and/or holes, the photocatalytic activity of the titanium dioxide fine particles is eliminated or reduced. Further, since the surface of the titanium dioxide fine particles has been treated with an organometal compound of zinc, the photocatalytic activity of the titanium dioxide fine particles is eliminated or reduced by the property of the organometal compound of zinc that can capture free electrons and/or holes of the organometal compound of zinc. Accordingly, when a coating film is formed using the first to fourth coating compositions according to the present invention, the coating film does not undergo or can reduce unfavorable phenomena such as a lowering in strength of the coating film or a yellowing phenomenon caused by a deterioration in the binder component derived from the photocatalytic activity.

Since the first to fourth coating compositions according to the present invention contain a dispersant, the titanium dioxide fine particles can be homogeneously dispersed in the coating liquid and the coating film formed using the coating liquid. Further, the long-term dispersion stability is also excellent. Accordingly, the pot life of the coating liquid is long, the coatability is also excellent, and, even after storage for a long period of time, a large-area even-thickness transparent thin film having a small haze value can easily be formed.

The second coating composition according to the present invention is advantageous in that, in addition to the advantage of the first coating composition according to the present invention, by virtue of the coating of the cobalt-doped titanium dioxide fine particles, contained in the coating composition, with the anionic polar group-containing organic compound and/or organometal compound, the titanium dioxide fine particles can be more evenly dispersed in the coating composition and the coating film formed using the coating composition as compared with the titanium dioxide fine particles in the first coating composition and thus can further lower the haze value of the coating film.

The third coating composition according to the present invention is advantageous in that, in addition to the advantage of the first coating composition according to the present invention, by virtue of the coating of the cobalt-doped titanium dioxide fine particles, contained in the coating composition, further with an inorganic compound having the property that can reduce or eliminate the photocatalytic activity, the titanium dioxide fine particles have lower photocatalytic activity than the titanium dioxide fine particles of the first coating composition.

The fourth coating composition according to the present invention is advantageous in that, in addition to the advantage of the first coating composition according to the present invention, by virtue of the coating of the cobalt-doped titanium dioxide fine particles, contained in the coating composition, further with an inorganic compound having the property that can reduce or eliminate the photocatalytic activity and further with anionic polar group-containing organic compound and/or organometal compound, as compared with the titanium dioxide fine particles in the first coating composition, the photocatalytic activity is lower and the titanium dioxide fine particles can be more evenly dispersed in the coating composition and the coating film formed using the coating composition and thus can further lower the haze value of the coating film.

In the coating film according to the present invention, the refractive index can be regulated by regulating the mixing amount of the titanium dioxide fine particles. Accordingly, the coating film is suitable for utilization as one or at least two light-transparent layers constituting the antireflective film.

In the first and second coating compositions according to the present invention, the titanium dioxide fine particles generally belong to high-refractive index fine particles. Accordingly, the coating films formed using the first and second coating compositions according to the present invention can be a medium-refractive index or high-refractive index coating film by varying the mixing amount of the titanium dioxide fine particles.

According to the present invention, when a coating film having a thickness (after curing) of 0.05 to 10 μm is formed, the refractive index can be regulated in the range of 1.55 to 2.20 and the haze value of the coating film as measured integrally with a base material according to JIS K 7361-1 can be brought to a value that is not different from or is different by not more than 1% from the haze value of said base material per se.

DESCRIPTION OF REFERENCE CHARACTERS USED IN THE DRAWINGS

Figure 1:
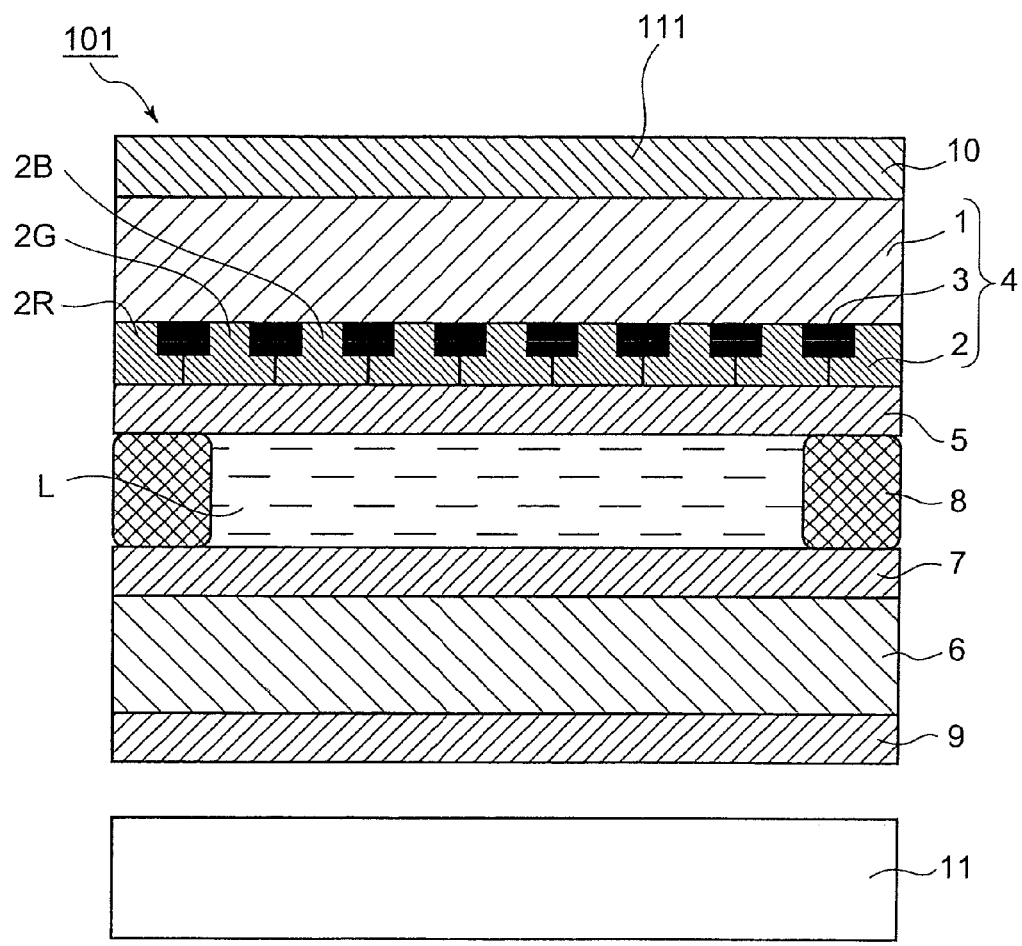
FIG. 1 is a typical cross-sectional view showing an embodiment of a liquid crystal display device having a display surface covered with a multilayered antireflective film comprising the coating film according to the present invention.

| | |
|---|---|
| 1: | glass substrate on display surface side; |
| 2: | pixel part; |
| 3: | black matrix layer; |
| 4: | color filter; |
| 5, 7: | transparent electrode layer; |
| 6: | glass substrate on backside; |
| 8: | seal material; |
| 9: | aligning film; |
| 10: | polarizing film; |
| 11: | backlight unit; |
| 12: | polarizing element; |
| 13, 14: | protective film; |
| 15: | adhesive layer; |
| 16: | hardcoat layer; |
| 17: | multilayered antireflective film; |
| 18: | medium-refractive index layer; |
| 19, 22: | high-refractive index layer; |
| 20, 23: | low-refractive index layer; |
| 21: | base material film; |
| 101: | liquid crystal display device; and |
| 102: | antireflective film. |

DETAILED DESCRIPTION OF THE INVENTION

The present invention will be described in more detail.
Titanium Dioxide Fine Particles The titanium dioxide fine particles used in the coating composition according to the present invention have a high refractive index and are colorless or are not substantially colored and thus are suitable as a component for regulating the refractive index. Forms of titanium oxide are classified into rutile form, anatase form, and amorphous form. Among them, the rutile form is preferred because of its higher refractive index than the anatase form and amorphous form of titanium oxide.

Since the coating composition according to the present invention contains the high-refractive index titanium dioxide fine particles, the refractive index of the coating film formed by using the coating composition can easily be regulated in a medium-refractive index to high-refractive index range by varying the addition amount of the high-refractive index titanium dioxide fine particles.

The titanium dioxide fine particles used are the so-called ultrafine particles from the viewpoint of avoiding a lowering in the transparency of the coating film. The term "ultrafine particles" as used herein generally refer to submicron order particles that have a smaller particle diameter than particles having a particle diameter of a few micrometers to a few hundred micrometers generally called "fine particles." Specifically, in the present invention, the titanium dioxide fine particles have a primary particle diameter of not less than 0.01 μm and not more than 0.1 μm, preferably not more than 0.03 μm. When the average particle diameter is less than 0.01 μm, the titanium dioxide fine particles cannot be evenly dispersed in the coating composition without difficulties and, in its turn, a coating film with the titanium dioxide fine particles evenly dispersed therein cannot be formed. On the other hand, when the average particle diameter is more than 0.1 μm, the transparency of the coating film is disadvantageously deteriorated.

The primary particle diameter of the titanium dioxide fine particles may be visually measured, for example, under a scanning electron microscope (SEM) or alternatively may be mechanically measured, for example, with a particle size distribution meter utilizing a dynamic light scattering method or a static light scattering method. When the primary particle diameter of the titanium dioxide fine particles is in the above-defined range, these titanium dioxide fine particles may be used in the present invention even when they are in a spherical, acicular or other form.

Since the titanium dioxide fine particles have photocatalytic activity, the formation of a coating film using a coating composition, which merely contains the fine particles is disadvantageous in that, by photocatalytic action, the chemical bond between the binder resins constituting the coating film is broken resulting in lowered coating film strength, or the coating is yellowed resulting in lowered transparency of the coating film that is likely to cause an increase in haze value.

In the first coating composition of the present invention, in order to remove this disadvantage, cobalt-doped titanium dioxide fine particles having the property that can capture free electrons and/or holes are used, and, further, titanium dioxide fine particles subjected to surface treatment with a zinc chelate compound capable of capturing free electrons and/or holes are used. Accordingly, the photocatalytic activity of the titanium dioxide fine particles is in a reduced or eliminated state.

In the second coating composition of the present invention, in order to remove this disadvantage, titanium dioxide fine particles produced by providing titanium dioxide fine particles, which have been doped with cobalt capable of capturing free electrons and/or holes, surface treating the titanium dioxide fine particles with an organometal compound of zinc capable of capturing free electrons and/or holes, and further coating the surface treated titanium dioxide fine particles with anionic polar group-containing organic compound and/or organometal compound are used. In the second coating composition according to the present invention, the photocatalytic activity of the titanium dioxide fine particles has been reduced or eliminated, and, further, the titanium dioxide fine particles have been coated with anionic polar group-containing organic compound and/or organometal compound. Accordingly, titanium dioxide fine particles can be efficiently dispersed in the coating composition.

In the third coating composition of the present invention, in order to remove the above disadvantage, titanium dioxide fine particles produced by coating titanium dioxide fine particles, which have been doped with cobalt capable of capturing free electrons and/or holes, with an inorganic compound capable of reducing or eliminating photocatalytic activity, and further surface treating the coated titanium dioxide fine particles with an organometal compound of zinc capable of capturing free electrons and/or holes are used. Accordingly, the treated titanium dioxide fine particles have lower photocatalytic activity than the titanium dioxide fine particles in the first coating composition according to the present invention.

In the fourth coating composition of the present invention, in order to remove the above disadvantage, titanium dioxide fine particles produced by coating titanium dioxide fine particles, which have been doped with cobalt capable of capturing free electrons and/or holes, with an inorganic compound capable of reducing or eliminating photocatalytic activity, further surface treating the coated titanium dioxide fine particles with an organometal compound of zinc capable of capturing free electrons and/or holes, and further coating the surface treated titanium dioxide fine particles with anionic polar group-containing organic compound and/or organometal compound are used. Accordingly, in the fourth coating composition according to the present invention, since the photocatalytic activity of the titanium dioxide fine particles has been reduced or eliminated, and, further, the titanium dioxide fine particles have been coated with anionic polar group-containing organic compound and/or organometal compound, the titanium dioxide fine particles can be efficiently dispersed in the coating composition.

Further, in the first to fourth coating compositions according to the present invention, the titanium dioxide fine particles can be efficiently dispersed in the coating composition by incorporating an anionic polar group-containing dispersant in the coating composition.

Process for Producing Cobalt-Doped Titanium Dioxide Fine Particles

In the cobalt-doped titanium dioxide fine particles used in the present invention, cobalt exists in the form of CoO and/or $Co_2O_3$. In the production process of cobalt-doped titanium dioxide fine particles, a pigment can be prepared by mixing base components of a titanium source and a cobalt source together and firing the mixture at a temperature of 600 to 1100° C. In the present invention, hydrous titanium oxide ultrafine particles may be used as the titanium source. This is a fine titanium dioxide sol having a rutile-type crystal structure that is a sol of fine hydrous titanium oxide having a peak derived from a rutile-type crystal as measured by X-ray diffractometry and has an average crystal grain diameter of generally 50 to 120 angstroms. This sol can be prepared, for example, by neutralizing an aqueous titanium tetrachloride solution with aqueous ammonia to pH 7 to 8 to prepare colloidal amorphous hydrous titanium oxide which is then ripened, or by heat treating amorphous hydrous titanium oxide such as metatitanic acid or orthotitanic acid in an aqueous sodium hydroxide solution and then heat treating the titanium oxide in a hydrochloric acid solution, or by heating an aqueous titanium sulfate solution or an aqueous titanium tetrachloride solution for hydrolysis. In the present invention, the fine titanium dioxide sol having the rutile-type crystal structure, either as such or after drying, may be pulverized to as small a size possible before use.

Various cobalt sources may be used as the cobalt source as the base component, and examples thereof include cobalt(II) chloride, cobalt(III) chloride, cobalt(II) sulfate, cobalt(III) sulfate, and cobalt(II) carbonate.

The raw materials of the titanium dioxide component and the cobalt component as the base component may be mixed together by various methods. For example, when powders are used as the raw materials, mere mixing of the powder suffices for contemplated results. On the other hand, when a compound solution of a base component of a cobalt source is used, for example, mixing may be carried out by adding the solution of the base component to ultrafine particles of hydrous titanium oxide, mixing them together and drying the mixture, or by adding the compound solution to a water dispersion slurry of ultrafine particles of hydrous titanium oxide, neutralizing the mixture with an acid or an alkali to precipitate each component on the surface of the hydrous titanium oxide. When a water dispersion of the cobalt source is used, mixing may be carried out by adding the water dispersion to a slurry of ultrafine particles of hydrous titanium oxide, mixing them together, and then filtering and washing the mixture.

The mixing ratio between the ultrafine particles of hydrous titanium oxide and cobalt is that the amount of cobalt in the form of CoO or $CO_2O_3$ is 1 to 10 parts by weight, preferably 3 to 7 parts by weight, based on 100 parts by weight of $TiO_2$ in the ultrafine particles of hydrous titanium oxide. When the amount of cobalt is less than 1 part by weight, the effect of lightfastness cannot be attained. On the other hand, when the amount of cobalt is more than 10 parts by weight, problems occur including lowered refractive index, the difficulty of regulating the particle diameter, and the production of other compounds such as $CoTiO_3$.

The raw material mixture prepared by the above mixing is fired at 600 to 1100° C. The raw material mixture may be in the form of slurry, cake, or dry powder. Upon firing, the components undergo a solid phase reaction to give cobalt-doped titanium dioxide fine particles that may be used in the present invention. In the present invention, since ultrafine particles of hydrous titanium oxide are used as the titanium source, titanium dioxide fine particles having an average single particle diameter of 0.01 to 0.1 μm can easily be produced by pulverizing the fired product with a dry pulverizer such as a micronizer, a jet mill, a roller mill, a bantam mill, or a sample mill. The firing may be carried out by various methods, for example, by using a stationary furnace such as an electric furnace or a tunnel kiln, or an internal combustion or external combustion rotary kiln.

Surface Treatment with Organometal Compound of Zinc

In the first to fourth coating composition according to the present invention, the titanium dioxide fine particles are subjected to surface treatment with an organometal compound of zinc from the viewpoint of improving lightfastness. The zinc chelate compound used in the present invention is preferably one or at least two compounds selected from zinc acetyl acetonate $Zn(CH_3COCHCOCH_3)_2$, zinc benzoate $Zn(C_6H_5COO)_2$, zinc acetate $Zn(CH_3COO)_2$, and zinc 2-ethylhexylacetate $Zn(CH_3(CH_2)_3CH(C_2H_5)COO)_2$. The titanium dioxide fine particles subjected to surface treatment with the organometal compound of zinc have eliminated or reduced photocatalytic activity.

In order to surface treat the titanium dioxide fine particles with an organometal compound of zinc, a method may also be adopted in which an organometal compound of zinc dissolved in a proper solvent such as alcohol is added to titanium dioxide fine particles after pulverization, and the mixture is mixed so that the titanium dioxide fine particles are evenly coated with the solution. Alternatively, a wet method may also be adopted in which titanium dioxide is slurried. Regarding the surface treatment amount, 1 to 10 parts by weight, preferably 3 to 7 parts by weight, based on 100 parts by weight of $TiO_2$, of the zinc chelate compound is added. The addition of more than 10 parts by weight of the zinc chelate compound adversely affects the dispersibility, refractive index, and film strength.

Coating Treatment with Inorganic Compound Having Property that can Reduce or Eliminate Photocatalytic Activity In the third and fourth coating compositions according to the present invention, the titanium dioxide fine particles are surface treated with the following inorganic compound from the viewpoint of further improving the lightfastness. One or at least two metal oxides selected from alumina, silica, zinc oxide, zirconium oxide, tin oxide, antimony-doped tin oxide, and indium-doped tin oxide are usable as the inorganic compound having the property that can reduce or eliminate the photocatalytic activity.

For the surface treatment with the inorganic compound, a method may be adopted which comprises adding a water soluble salt of at least one element selected from the group consisting of aluminum, silicon, zinc, zirconium, tin, indium, and antimony to a water dispersion liquid of the titanium dioxide fine particles and neutralizing the mixture with an acid or an alkali to precipitate a hydrous oxide on the surface of the titanium dioxide fine particles. The water soluble salt as a by-product is removed by decantation, filtration, and washing, followed by drying and pulverization. The surface treatment amount is 1 to 15 parts by weight, preferably 5 to 10 parts by weight, based on 100 parts by weight of $TiO_2$. When the surface treatment amount is not less than 15 parts by weight, the refractive index is lowered.

Coating Treatment with Anionic Polar Group-Containing Organic Compound and/or Organometal Compound In the second and fourth coating compositions according to the present invention, in order to impart dispersibility in the preparation of ink, after the surface treatment with the organometal compound of zinc, further surface treatment is carried out with anionic polar group-containing organic compound and/or organometal compound. This surface treatment is carried out in the same manner as in the surface treatment with the organometal compound of zinc. If necessary, heat treatment may be carried out for chemical adsorption.

Anionic polar group-containing organic compounds include organic carboxylic acids. Organic carboxylic acids containing an anionic polar group such as a carboxyl, phosphoric acid or hydroxyl group are used as the organic carboxylic acid. Examples thereof include stearic acid, lauric acid, oleic acid, linolic acid, linoleic acid, pentaerythritol triacrylate, dipentaerythritol pentaacrylate, EO (ethylene oxide)-modified phosphoric acid triacrylate, and ECH-modified glycerol triacrylate.

Anionic polar group-containing organometal compounds usable herein include silane coupling agents and titanate coupling agents. Specific examples of silane coupling agents include 3-glycidoxy propyltrimethoxysilane, 3-glycidoxy propylmethyldimethoxysilane, 2-(3,4-epoxycyclohexyl)ethyltrimethoxysilane, 3-aminopropyltriethoxysilane, 3-aminopropyltrimethoxysilane, N-(2-aminoethyl)3-aminopropylmethyldiethoxysilane, 3-mercaptopropyltrimethoxysilane, vinyltrimethoxysilane, vinyltriethoxysilane, vinyltris(2-methoxyethoxy)silane, and 3-methacryloxypropyltrimethoxysilane.

Specific examples of titanate coupling agents usable herein include PLENACT KR-TTS, PLENACT KR-46B, PLENACT KR-55, PLENACT KR-41B, PLENACT KR-38S, PLENACT KR-138S, PLENACT KR-238S, PLENACT KR-338X, PLENACT KR-44, PLENACT KR-9SA, and PLENACT KR-ET (tradename) that are commercially available from Ajinomoto Co., Inc.; and metal alkoxides such as tetramethoxytitanium, tetraethoxytitanium, tetraisopropoxytitanium, tetra-n-propoxytitanium, tetra-n-butoxytitanium, and tetra-tert-butoxytitanium.

These anionic polar group-containing organic compounds and/or organometal compound may be used either solely or a combination of two or more. In order to cover the titanium dioxide fine particles with anionic polar group-containing organic compound and/or organometal compound to impart hydrophobicity to the titanium dioxide fine particles, a method may be adopted which comprises dissolving anionic polar group-containing organic compound and/or organometal compound in an organic solvent, dispersing the above titanium dioxide fine particles doped with a metal having the property that can capture free electrons and/or holes, and fully evaporating the organic solvent to cover the titanium dioxide fine particles with the compound.

In the second and fourth coating compositions, the titanium dioxide fine particles are covered with anionic polar group-containing organic compound and/or organometal compound. Accordingly, the titanium dioxide fine particles can be evenly dispersed in a coating liquid as well as in a coating film formed using the coating liquid, and, at the same time, has good coatability, whereby the haze value of the coating film is lowered and an even thin film having a large area can be formed.

Binder Component

The binder component in the coating composition according to the present invention is preferably curable with an ionizing radiation and is incorporated as an indispensable component into the coating composition according to the present invention from the viewpoint of imparting film forming properties or adhesion to the base material and the adjacent layer to the coating composition. The ionizing radiation curing binder component is present in an unpolymerized monomer or oligomer state in the coating composition. Accordingly, the coating composition has excellent coatability and can easily form an even large-area thin film. Further, satisfactory coating film strength can be provided by polymerizing and curing, after coating, the binder component in the coating film.

The ionizing radiation curing binder component may be a functional group-containing monomer or oligomer that, upon exposure to an ionizing radiation such as ultraviolet light or electron beams, undergoes a polymerization reaction either directly or indirectly through the action of an initiator. In the present invention, a radical polymerizable monomer or oligomer having an ethylenical double bond may be mainly used. If necessary, a photoinitiator may be used in combination with the monomer or oligomer. However, other ionizing radiation curing binder components may also be used, and examples thereof include photocationically polymerizable monomers and oiligomers such as epoxy group-containing compounds. The photocationically polymerizable binder component may if necessary be used in combination with a photocation polymerization initiator. The monomer or oligomer as the binder component is preferably a polyfunctional binder component containing two or more polymerizable functional groups so that crosslinking occurs between molecules of the binder component.

Specific examples of ethylenical double bond-containing radical polymerizable monomers and oligomers include monofunctional (meth)acrylates such as 2-hydroxyethyl (meth)acrylate, 2-hydroxypropyl (meth)acrylate, hydroxybutyl acrylate, 2-hydroxy-3-phenoxypropyl acrylate, carboxypolycaprolactone acrylate, acrylic acid, methacrylic acid, and acrylamide; pentaerythritol triacrylate; diacrylates such as ethylene glycol diacrylate and pentaerythritol diacrylate monostearate; tri(meth)acrylates such as trimethylolpropane triacrylate and pentaerythritol triacrylate; polyfunctional (meth)acrylates such as pentaerythritol tetraacrylate derivatives and dipentaerythritol pentaacrylate; or oligomers produced by polymerizing these radical polymerizable monomers. The term "(meth)acrylate" as used herein means acrylate and/or methacrylate.

Among the ionizing radiation curing binder components, binder components with a hydroxyl group remaining in the molecule thereof are preferably used. Since the hydroxyl group is also an anionic polar group, the binder component has high affinity for titanium dioxide fine particles and can function as a dispersion assistant. Accordingly, the use of this binder component can improve the dispersibility of the titanium dioxide fine particles in the coating composition and the coating film and further can advantageously reduce the amount of the dispersant used. Since the dispersant does not function as a binder, the coating film strength can be improved by reducing the mixing ratio of the dispersant. Further, the hydroxyl group contained in the binder can improve the adhesion to an adjacent layer such as a hardcoat layer or a low-refractive index layer by a hydrogen bond. For example, the formation of a medium- to high-refractive index layer using a coating composition with a hydroxyl group-containing binder component incorporated thereinto can realize excellent adhesion, for example, to a hardcoat layer or a low-refractive index layer formed using a coating liquid by the so-called "wet method," as well as to a low-refractive index layer formed by the so-called "dry method" such as vapor deposition.

Specific examples of binder components with a hydroxyl group remaining in the molecule thereof include those in which a pentaerythritol polyfunctional (meth)acrylate or a dipentaerythritol polyfunctional (meth)acrylate is a skeleton of the binder resin and a hydroxyl group remains in the molecule. In the binder component, two or more molecules of (meth)acrylic acid are bonded through an ester bond to one molecule of pentaerythritol or dipentaerythritol. In this case, a part of the hydroxyl group originally present in the molecule of pentaerythritol or dipentaerythritol remains unesterified. Examples thereof include pentaerythritol triacrylate. Pentaerythritol polyfunctional acrylate and dipentaerythritol polyfunctional acrylate contain two or more ethylenical double bonds in one molecule. Accordingly, a crosslinking reaction occurs during polymerization, and, thus, high coating film strength can be realized.

Dispersant

The dispersant can evenly disperse titanium dioxide fine particles in the coating composition (coating liquid) according to the present invention, can realize even dispersion of the titanium dioxide fine particles in the coating film formed using the coating liquid, can prolong the pot life of the coating liquid, and can realize the formation of a transparent film having a low haze value.

Preferably, the dispersant contains an anionic polar group. The anionic polar group-containing dispersant has high affinity for titanium dioxide fine particles and is added to impart dispersibility to titanium dioxide fine particles in the coating composition according to the present invention. Further, the anionic polar group-containing dispersant can improve adhesion to other layer, for example, an adjacent layer such as a hardcoat layer or a low-refractive index layer, by a hydrogen bond.

Anionic polar groups include, for example, carboxyl, phosphoric acid, and hydroxyl groups.

Specific examples of anionic polar group-containing dispersants include a group of products supplied from BYK-Chemie Japan K.K. under the tradename of Disperbyk, for example, Disperbyk-111, Disperbyk-110, Disperbyk-116, Disperbyk-140, Disperbyk-161, Disperbyk-162, Disperbyk-163, Disperbyk-164, Disperbyk-170, Disperbyk-171, Disperbyk-174, Disperbyk-180, and Disperbyk-182.

Among them, compounds, which have a molecular structure comprising the side chain of an anionic polar group or the side chain containing an anionic polar group attached to a main chain having an ethylene oxide chain skeleton and have a number average molecular weight of 2,000 to 20,000, are preferred because particularly good dispersibility can be provided. The number average molecular weight may be measured by GPC (gel permeation chromatography). Among the above-described Disperbyk series, Disperbyk 163 (Disperbyk-163) may be mentioned as satisfying the above requirement.

The mixing ratio of the dispersant may be 2 to 4 parts by weight based on 10 parts by weight of the titanium dioxide fine particles. The mixing ratio of the binder component may be 4 to 20 parts by weight.

Organic Solvent

The organic solvent for dissolving and dispersing the solid component in the coating composition according to the present invention is not particularly limited, and various solvents may be used. Examples thereof include alcohols such as isopropyl alcohol, methanol, and ethanol; ketones such as methyl ethyl ketone, methyl isobutyl ketone, and cyclohexanone; esters such as ethyl acetate and butyl acetate; halogenated hydrocarbons; aromatic hydrocarbons such as toluene and xylene; or mixtures thereof.

When the coating composition according to the present invention is prepared using a ketone solvent, the coating composition can easily be coated onto the base material surface thinly and evenly. At the same time, the evaporation rate of the solvent after coating is proper, and, thus, uneven drying is less likely to occur. Accordingly, an evenly thin large-area coating film can advantageously be easily formed. A single solvent composed of one ketone, a mixed solvent composed of two or more ketones, and a solvent, containing one or at least two ketones and additionally other solvent(s), which does not lose properties as the ketone solvent may be used as the ketone solvent. A ketone solvent, in which not less than 70% by weight, particularly not less than 80% by weight, of the solvent is accounted for by one or at least two ketones, is preferred.

A coating composition, which is excellent particularly in coatability, can be provided by using a ketone solvent as an organic solvent and covering the surface of the titanium dioxide fine particles with the above organic compound and/or organometal compound, and this coating composition can easily form an even large-area thin film. Also in this case, the use of the ethylene oxide-type dispersant described above as an anionic polar group-containing dispersant, that is, the use of a compound having a molecular structure comprising a main chain having an ethylene oxide chain skeleton and a side chain of an anionic polar group or an anionic polar group-containing side chain attached to the main chain and having a number average molecular weight of 2,000 to 20,000, is more preferred.

The mixing ratio of the organic solvent is preferably such that, when the total amount of the solid matter and the organic solvent in the coating composition according to the present invention is 100 parts by weight, the mixing ratio of the organic solvent is 50 to 99.5 parts by weight based on 0.5 to 50 parts by weight of the total solid content of the coating composition according to the present invention. When the amount of the organic solvent used is in this amount range, a coating composition, which is excellent particularly in dispersion stability and is suitable for long-term storage, can be provided.

Photoinitiator

When an ionizing radiation curing resin is used in the binder component, a photoinitiator is preferably added to the binder to induce radical polymerization. Photoinitiators include, for example, acetophenones, benzophenones, ketals, anthraquinones, disulfide compounds, thiuram compounds, and fluoroamine compounds. More specific examples thereof include 1-hydroxy-cyclohexyl-phenyl-ketone, 2-methyl-1-[4-(methylthio)phenyl]-2-morpholinopropan-1-one, benzyl dimethyl ketone, 1-(4-dodecylphenyl)-2-hydroxy-2-methyl-propan-1-one, 2-hydroxy-2-methyl-1-phenylpropan-1-one, 1-(4-isopropylphenyl)-2-hydroxy-2-methylpropan-1-one, and benzophenone. Among them, 1-hydroxy-cyclohexyl-phenyl-ketone and 2-methyl-1-[4-(methylthio)phenyl]-2-morpholinopropan-1-one is preferred in the present invention, because they, even when used in a small amount, can function to accelerate the initiation of the polymerization reaction upon exposure to an ionizing radiation. Any one of them may be used solely, or alternatively the two compounds may be used in combination. The above compounds are commercially available. For example, 1-hydroxy-cyclohexyl-phenyl-ketone is available as Irgacure-184 (tradename: Ciba Specialty Chemicals, K.K.).

Other Components

The coating composition according to the present invention may if necessary contain, in addition to the above indispensable components, a polymerization initiator for the ionizing radiation curing binder component and other components. For example, if necessary, ultraviolet shielding agents, ultraviolet absorbers, and surface conditioning agents (leveling agents) may be used.

Mixing Ratio of Components

The mixing ratio of the components can be properly regulated. In general, however, 4 to 20 parts by weight of the binder component and 2 to 4 parts by weight of the anionic polar group-containing dispersant are incorporated based on 10 parts by weight of the titanium dioxide fine particles. In particular, when a compound in which a hydroxyl group remains in the molecule is used as the binder component, the binder component functions as a dispersion aid. Accordingly, the amount of the anionic polar group-containing dispersant used can be significantly reduced. The amount of the anionic polar group-containing dispersant used can be reduced to 2 to 4 parts by weight. Since the dispersant does not function as the binder, the coating film strength can be improved by reducing the mixing ratio of the dispersant.

In incorporating the photoinitiator into the coating composition according to the present invention, the photoinitiator is generally incorporated in an amount of 3 to 8 parts by weight based on 100 parts by weight of the binder component.

The amount of the organic solvent is properly regulated so that the components can be homogeneously dissolved and dispersed, aggregation does not occur during storage after the preparation, and the concentration in the coating is not excessively low. In this case, a method is preferably adopted in which the amount of the solvent used is reduced in such an amount range that can satisfy this requirement to prepare a high-concentration coating composition for storing the coating composition in such a state that requires no significant volume, and, in use, a necessary amount of the high-concentration coating composition is taken out and is diluted to a concentration suitable for coating.

The mixing ratio of the organic solvent is preferably such that, when the total amount of the solid matter and the organic solvent in the coating composition according to the present invention is 100 parts by weight, the organic solvent is incorporated in an amount of 50 to 99.5 parts by weight based on 0.5 to 50 parts by weight of the total solid content of the coating composition according to the present invention. More preferably, the organic solvent is used in an amount of 70 to 90 parts by weight based on 10 to 30 parts by weight of the total solid content of the coating composition according to the present invention. When the amount of the solvent is in the above-defined range, a coating composition, which has excellent dispersion stability and is suitable for long-term storage, can be provided.

Preparation of Coating Composition

In preparing the coating composition according to the present invention using the above components, dispersion treatment may be carried out by a conventional method for preparing a coating liquid. For example, the coating composition can be prepared by mixing the indispensable component and the desired components in any desired order, introducing media such as beads into the mixture, and subjecting the mixture to proper dispersion treatment, for example, in a paint shaker or a bead mill.

Object to be Coated

The base material to be coated with the coating composition according to the present invention is not particularly limited. preferred base materials include, for example, glass plates, or films formed of various resins, for example, cellulose triacetate (TAC), polyethylene terephthalate (PET), diacetyl cellulose, cellulose acetate butylate, polyethersulfone, or acrylic resin; polyurethane resin; polyester; polycarbonate; polysulfone; polyether; trimethylpentene; polyether ketone; or (meth)acrylonitrile. The thickness of the base material is generally about 25 μm to 1000 μm.

Method for Coating Film Formation

The coating composition according to the present invention can be coated onto the base material by various methods such as spin coating, dip coating, spraying, slide coating, bar coating, roll coating, meniscus coating, flexographic printing, screen printing, or bead coating.

A coating film is formed by coating the coating composition according to the present invention onto a surface of an object such as a base material at a desired coverage, then generally heat drying the coating by heating means such as an oven, and then exposing the dried coating to an ionizing radiation such as ultraviolet light or electron beams to cure the coating.

Features of Coating Composition

In the first to fourth coating compositions according to the present invention, the titanium dioxide fine particles having photocatalytic activity have been doped with cobalt. By virtue of the property of cobalt that can capture free electrons and/or holes, the photocatalytic activity of the titanium dioxide fine particles is eliminated or reduced. Further, since the surface of the titanium dioxide fine particles has been treated with a zinc chelate compound, the photocatalytic activity of the titanium dioxide fine particles is eliminated or reduced by the property of the organometal compound of zinc that can capture free electrons and/or holes. Accordingly, when a coating film is formed using the first to fourth coating compositions according to the present invention, the coating film does not undergo or can reduce unfavorable phenomena such as a lowering in strength of the coating film or a yellowing phenomenon caused by a deterioration in the binder component derived from the photocatalytic activity.

Since the first to fourth coating compositions according to the present invention contain a dispersant, the titanium dioxide fine particles can be homogeneously dispersed in the coating liquid and the coating film formed using the coating liquid. Further, the long-term dispersion stability is also excellent. Accordingly, the pot life of the coating liquid is long, the coatability is also excellent, and, even after storage for a long period of time, a large-area even-thickness transparent thin film having a small haze value can easily be formed.

Further, in the second and fourth coating compositions according to the present invention, the titanium dioxide fine particles are covered with anionic polar group-containing organic compound and/or organometal compound before the surface treatment with an organometal compound of zinc. Accordingly, the second and fourth coating compositions according to the present invention is advantageous in that, in addition to the above advantage, the titanium dioxide fine particles can be more evenly dispersed in the coating composition and the coating film formed using the coating composition as compared with the titanium dioxide fine particles in the first coating composition and thus can further lower the haze value of the coating film.

In the third and fourth coating compositions according to the present invention, titanium dioxide fine particles doped with cobalt having the property that can capture free electrons and/or holes are coated with an inorganic compound capable of reducing or eliminating the photocatalytic activity. Accordingly, the third and fourth compositions are advantageous in that, in addition to the above advantage, the coating compositions can form coating films having further improved lightfastness as compared with the coating film formed using the first coating composition according to the present invention.

Features of Coating Film

In the first coating composition according to the present invention, titanium dioxide fine particles with eliminated or reduced photocatalytic activity produced by surface treating titanium dioxide fine particles, doped with cobalt having the property that can capture free electrons and/or holes, with an organometal compound of zinc having the property that can capture free electrons and/or holes have been dispersed with the aid of an dispersant. By virtue of this constitution, the titanium dioxide fine particles are evenly dispersed in the first coating film according to the present invention formed using the coating composition, and, thus, an increase in haze value of the coating film can be suppressed.

The second coating film according to the present invention formed using the second coating composition according to the present invention uses titanium dioxide fine particles produced by surface treating titanium dioxide fine particles with an organometal compound of zinc and then further covering the surface treated titanium dioxide fine particles with anionic polar group-containing organic compound and/or organometal compound. By virtue of this constitution, the second coating film according to the present invention is advantageous in that, in addition to the above advantage of the first coating film, the titanium dioxide fine particles are more evenly dispersed in the coating film as compared with the first coating film. Accordingly, the second coating film according to the present invention has a further lowered haze value.

The third coating film according to the present invention formed using the third coating composition according to the present invention uses titanium dioxide fine particles produced by coating titanium dioxide fine particles with an inorganic compound capable of reducing or eliminating the photocatalytic activity before surface treatment with an organometal compound of zinc. By virtue of this constitution, the third coating film according to the present invention is advantageous in that, in addition to the advantage of the first coating film, the lightfastness of the third coating film according to the present invention is further improved due to the reduced or eliminated photocatalytic activity of the titanium dioxide fine particles.

The fourth coating film according to the present invention formed using the fourth coating composition according to the present invention uses titanium dioxide fine particles produced by coating titanium dioxide fine particles with an inorganic compound capable of reducing or eliminating the photocatalytic activity before surface treatment with an organometal compound of zinc and, after the surface treatment of the titanium dioxide fine particles with the organometal compound of zinc, further covering the surface treated titanium dioxide fine particles with anionic polar group-containing organic compound and/or organometal compound. By virtue of this constitution, the fourth coating film according to the present invention is advantageous in that, in addition to the advantage of the first coating film, the titanium dioxide fine particles are more evenly dispersed in the coating film as compared with the first coating film and, thus, the haze value of the coating film is lower, and, further, the fourth coating film has further improved lightfastness due to the reduced or eliminated photocatalytic activity of the titanium dioxide fine particles.

The coating film according to the present invention can be suitably utilized as one or at least two layers for constituting an antireflective film and is suitable for the formation of a medium- to high-refractive index layer. The coating film according to the present invention can be used for the formation of at least one layer in a multilayered antireflective film formed of a laminate of two or more layers which are transparent to light and are different from each other in refractive index (light transparent layers). In the present specification, a layer having the highest refractive index in the layers constituting the multilayered antireflective film is referred to as "high-refractive index layer," a layer having the lowest refractive index layer is referred to as "low-refractive index layer," and other layer having a medium refractive index is referred to as "medium-refractive index layer."

According to the present invention, when a coating film having a thickness, after curing, of 0.05 to 10 μm and a refractive index of 1.55 to 2.20 is formed, the haze value of the coating film as measured integrally with a base material according to JIS K 7361 can be brought to a value not different from or a value different by not more than 1% from the haze value of the base material per se.

When the balance between the refractive index of the covering surface per se and the refractive index of the coating film according to the present invention is good, an antireflective effect can be attained even by providing only one layer of the coating film according to the present invention on a surface to be covered with an antireflective film, for example, on a display surface of an image display device. Accordingly, the coating film according to the present invention sometimes effectively functions also as a single-layered antireflective film.

The coating film according to the present invention is particularly suitable for the formation of at least one layer, particularly a medium- to high-refractive index layer, in a multilayered antireflective film for covering the display surface of image display devices, for example, liquid crystal display devices (LCDs), cathode-ray tube display devices (CRTs), plasma display panels (PDPs), and electroluminescent displays (ELDs).

Examples of Applications of Coating Film

FIG. 1 is a typical cross-sectional view of an embodiment of a liquid crystal display device 101 having a display surface covered with a multilayered antireflective film comprising the coating film according to the present invention as a light-transparent layer. The liquid crystal display device 101 has been prepared by providing a color filter 4, comprising a RGB pixel part 2 (2R, 2G, 2B) and a black matrix layer 3 provided on one side of a display surface-side glass substrate 1, providing a transparent electrode layer 5 on the pixel part 2 in the color filter 4, providing a transparent electrode layer 7 on one side of a back surface-side glass substrate 6, disposing the back surface-side glass substrate 6 and the color filter 4 opposite to each other so that the transparent electrode layers 5, 7 face each other while providing a predetermined gap between the transparent electrode layers 5, 7, bonding the periphery with a sealing material 8, filling a liquid crystal L into the gap, forming an aligning film 9 on the outer surface of the back surface-side glass substrate 6, applying a polarizing film 10 on the outer surface of the display surface-side glass substrate 1, and disposing a backlight unit 11 behind the aligning film 9.

Figure 2:
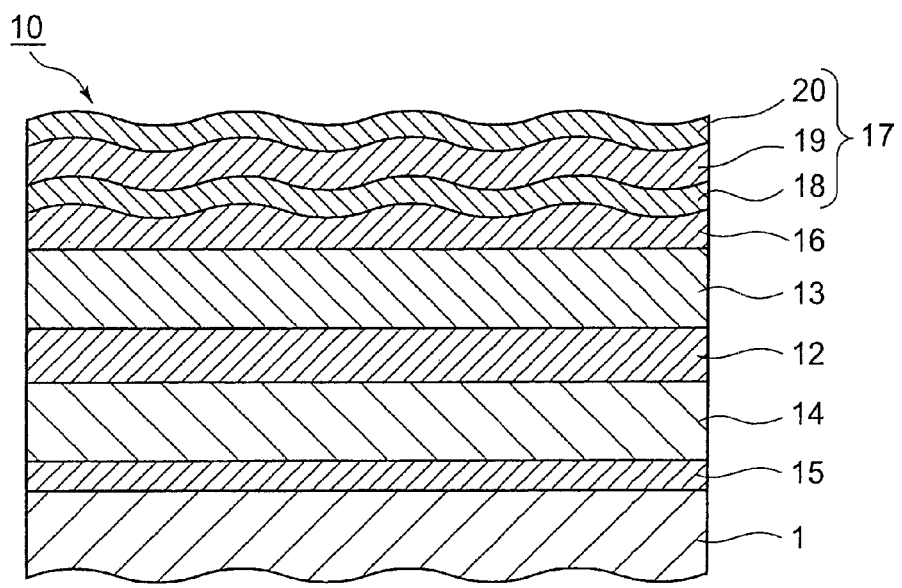
FIG. 2 is a schematic cross-sectional view of a polarizing film applied to the outer surface of a glass substrate on a display surface side in the liquid crystal display device shown in FIG. 1.

FIG. 2 is a typical cross-sectional view of the polarizing film 10 applied to the outer surface of the display surface-side glass substrate 1. The display surface-side polarizing film 10 has been produced by covering both sides of a polarizing element 12 formed of polyvinyl alcohol (PVA) or the like respectively with protective films 13, 14 formed of triacetylcellulose (TAC) or the like, providing an adhesive layer 15 on the protective film on the back surface side of the assembly, and providing a hardcoat layer 16 and a multilayered antireflective film 17 in that order on the viewing side of the assembly. The assembly is applied through the adhesive layer 15 onto a display surface-side glass substrate 1.

In order to reduce dazzling by diffusing light emitted from the inside of the liquid crystal display device 101, the hardcoat layer 16 may be constructed so as to serve also as an anti-dazzling layer (an anti-glare layer). In this case, the surface of the hardcoat layer 16 may be formed in a concave convex shape. Alternatively, an inorganic or organic filler is dispersed into the hardcoat layer 16 to scatter light within the hardcoat layer 16.

The multilayered antireflective film 17 part has a three-layer structure comprising a medium-refractive index layer 18, a high-refractive index layer 19, and a low-refractive index layer 20 stacked in that order from the backlight unit 11 side toward the viewing side. The multilayered antireflective film 17 may have a two-layer structure comprising a high-refractive index layer 19 and a low-refractive index layer 20 stacked in that order. When the surface of the hardcoat layer 16 is formed in a concave convex shape, the multilayered antireflective film 17 provided on the hardcoat layer 16 also generally has a concave convex shape as shown in FIG. 2.

The low-refractive index layer 20 may be formed, for example, by using a coating film having a refractive index of not more than 1.46 formed using a coating liquid containing an inorganic material such as silica or magnesium fluoride or a fluororesin. The medium-refractive index layer 18 and the high-refractive index layer 19 may be formed by coating the coating composition according to the present invention. A light-transparent layer having a refractive index in the range of 1.46 to 1.80 is used as the medium-refractive index layer 18, and a light-transparent layer having a refractive index of not less than 1.65 is used as the high-refractive index layer 19.

Since the reflectance of light applied from an external light source is reduced by the action of the multilayered antireflective film 17, the reflected glare of scenery or fluorescent lamps is reduced and, thus, the visibility of the display can be improved. Further, the hardcoat layer 16 can be constructed so as to serve also as an anti-dazzling layer. In this case, since straight light from the inside of the assembly and external light are scattered, reflection-derived dazzling is reduced and, consequently, the visibility of the display can be further improved.

In the case of the liquid crystal display device 101, the following construction may be adopted. The coating composition according to the present invention is coated onto a laminate of a polarizing element 12 and protective films 13, 14 to form a medium-refractive index layer 18 having a refractive index regulated in the range of 1.46 to 1.80 and a high-refractive index layer 19 regulated to not less than 1.65. A low-refractive index layer 20 is further provided. The polarizing film 10 comprising the multilayered antireflective film 17 can be applied through the adhesive layer 15 onto the display surface-side glass substrate 1.

On the other hand, in the case of CRT, since any polarizing film 10 is not applied onto the display surface of CRT, the antireflective film should be directly provided. Coating the coating composition according to the present invention onto the display surface of CRT is troublesome work. In this case, since an antireflective film is formed by preparing an antireflective film comprising the coating film according to the present invention and applying the antireflective film onto the display surface, there is no need to coat the coating composition according to the present invention onto the display surface.

An antireflective film may be prepared by stacking two or more light-transparent layers, which are transparent to light and are different from each other in refractive index, onto one side or both sides of a light-transparent base material film, in which at least one of the light-transparent layers is formed of the coating film according to the present invention. The base material film and the light-transparent layer should have light transmittance high enough to be usable as a material for the antireflective film and are preferably as transparent as possible.

Figure 3:
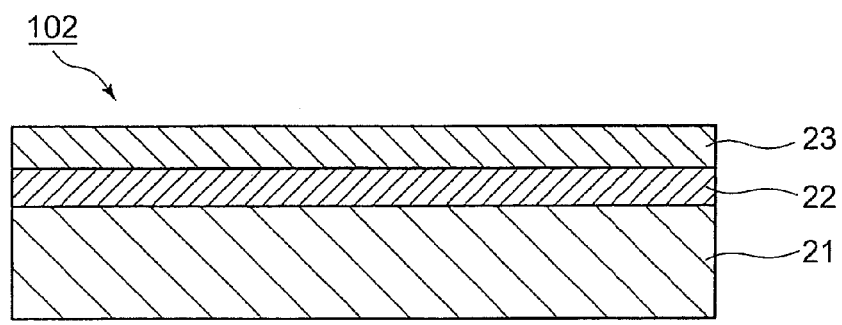
FIG. 3 is a schematic cross-sectional view showing an embodiment of an antireflective film comprising the coating film according to the present invention.

FIG. 3 is a typical cross-sectional view of an embodiment of an antireflective film 102 comprising the coating film according to the present invention. The antireflective film 102 is formed by coating the coating composition according to the present invention onto one side of a light-transparent base material film 21 to form a high-refractive index layer 22 and further providing a low-refractive index layer 23 on the high-refractive index layer 22. In this embodiment, only two layers, that is, the high-refractive index layer 22 and the low-refractive index layer 23, are provided as the light-transparent layers different from each other in refractive index. Alternatively, three or more light-transparent layers may be provided. In this case, not only the high-refractive index layer 22 but also the medium-refractive index layer may be formed by coating the coating composition according to the present invention.

Example 1

(1) Preparation of Titanium Dioxide Fine Particles

An aqueous titanium tetrachloride solution (500 ml) having a concentration of 200 g/liter as $TiO_2$ and an aqueous sodium hydroxide solution having a concentration of 100 g/liter as $Na_2O$ were added parallelly into water so that the pH value of the system was maintained at 5 to 9, followed by ripening for a predetermined period of time. The hydrous titanium dioxide precipitate of ultrafine particles thus obtained was filtered and washed and was again dispersed in water to prepare a hydrous titanium dioxide slurry having a concentration of 100 g/liter as $TiO_2$. An aqueous cobalt sulfate solution (25 ml) having a concentration of 200 g/liter CoO (prepared by dissolving $CoSO_4$ in a 20% sulfuric acid solution) was added to the slurry, and the mixture was adjusted to pH 7 by the addition of 20% aqueous ammonia solution to produce a precipitate of the cobalt component. The hydrous titanium dioxide slurry thus treated was thoroughly stirred in a homomixer, was fired at 800° C. for 5 hr in an electric oven, was allowed to cool, and was subjected to dry grinding to prepare titanium dioxide fine particles doped with 5% of CoO.

The CoO-doped titanium dioxide fine particles prepared in the above step were dispersed in water to prepare a slurry having a solid content of 100 g/liter, were subjected to wet grinding, and were then heated to 70° C. An aqueous sodium aluminate solution in an amount of 8% by weight as $Al_2O_3$ based on the solid content of the slurry and sulfuric acid were added parallelly thereto so that the pH value of the system was maintained at 7 to 10, whereby hydrous aluminum oxide was precipitated on and covered the surface of the titanium dioxide fine particles. Thereafter, the particles were filtered, were washed, were dried, and were then subjected to dry grinding to prepare hydrous aluminum oxide-coated titanium dioxide fine particles.

Zinc acetyl acetonate dissolved in a methanol solution was added in an amount of 3% by weight based on the solid content of the hydrous aluminum oxide-coated titanium dioxide fine particles prepared in the above step, followed by mixing in a homomixer for homogeneous surface treatment to prepare titanium dioxide fine particles subjected to surface treatment with zinc acetyl acetonate.

In order to further impart dispersibility to titanium dioxide fine particles subjected to surface treatment with zinc acetyl acetonate prepared in the above step, 3% by weight of stearic acid dissolved in a hexane solution was added, followed by mixing for homogenous surface treatment in a homomixer. The mixture was heat treated at 100° C. for a reaction. The reaction product was titanium dioxide fine particles of a rutile-type crystal which had an average single particle diameter (as measured by electron microscopy) of 30 to 40 nm and had a water repellent surface.

(2) Preparation of Coating Composition for High-Refractive Index Layer Formation Rutile-type titanium dioxide fine particles prepared in step (1) as titanium dioxide fine particles, pentaerythritol triacrylate (PET30: tradename, manufactured by Nippon Kayaku Co., Ltd.) as an ionizing radiation curing binder component, a block copolymer, having affinity for a pigment, as a dispersant having anionic polar group (Disperbyk 163: tradename, manufactured by BYK-Chemie Japan KK), and methyl isobutyl ketone as an organic solvent were placed in a mayonnaise bottle and were stirred in a paint shaker using zirconia beads as a medium (0.3 mmϕ) in an amount of about 4 times that of the mixture for 10 hr. After stirring, 1-hydroxy-cyclohexyl-phenyl-ketone (Irgacure 184: tradename, manufactured by Ciba Specialty Chemicals, K.K.) as a photoinitiator was added at the following mixing ratio to prepare a coating composition for high-refractive index layer formation of Example 1.

(Formulation)
High-Refractive Index Material (TiO2):

| | |
|---|---|
| Titania fine particles prepared in the above (1) | 10 parts by weight |
| Dispersant: Disperbyk 163 (tradename, manufactured by BYK-Chemie Japan KK) | 2 parts by weight |
| Photocuring resin: PET30 (tradename, manufactured by Nippon Kayaku Co., Ltd.) | 4 parts by weight |
| Photoinitiator: IRGACURE 184 (tradename, manufactured by Ciba Specialty Chemicals, K.K.) | 0.2 part by weight |
| Solvent: Methyl isobutyl ketone (manufactured by Junsei Chemical Corporation) | 37.3 parts by weight |

(3) Preparation of Coating Composition for Hardcoat Layer Formation

A coating composition for hardcoat layer formation was prepared by mixing the following components according to the following formulation.

| | |
|---|---|
| Pentaerythritol triacrylate (PETA: tradename, manufactured by Nippon Kayaku Co., Ltd.) | 50 parts by weight |
| photoinitiator: IRGACURE 184 (tradename, manufactured by Ciba Specialty Chemicals, K.K.) | 2.5 parts by weight |
| Solvent: methyl isobutyl ketone (manufactured by Junsei Chemical Corporation) | 47.5 parts by weight |

(4) Formation of Coating Film

A coating composition for hardcoat layer formation, prepared in step (3), immediately after the preparation was coated by a bar coater #10 onto an 80 μm-thick surface-untreated TAC film base material (FT-T80UZ: tradename, manufactured by Fuji Photo Film Co., Ltd.), and the coating was heat dried at 60° C. for one min. The dried coating was cured using as a light source an H bulb of an UV irradiation device (manufactured by Fusion UV Systems Japan K.K.) at an exposure of 100 $mJ/cm^2$ to form a transparent film having a thickness (after curing) of about 5 μm.

Thereafter, the coating composition for high-refractive index layer formation prepared in step (2) was coated by a bar coater #2, and the coating was heat dried at 60° C. for one min. The dried coating was cured using as a light source an H bulb of an UV irradiation device at an exposure of 100 $mJ/cm^2$ to form a transparent film having a thickness (after curing) of about 60 nm.

For the transparent film having a thickness (after curing) of about 60 nm, the haze value and the refractive index were measured. The haze value was measured with a tubidimeter NDH2000 (tradename, manufactured by Nippon Denshoku Co., Ltd.). Further, the refractive index of the coating film after curing was measured with a spectroscopic ellipsometer (UVSEL: tradename, manufactured by JOBIN YVON) at a helium laser beam wavelength of 633 nm.

As a result, the haze value of the transparent film was substantially equal to that of the base material, that is, 0.3, and the refractive index was good and 1.90.

The coating film thus obtained was subjected to a lightfastness test with a sunshine weather-o-meter. The surface of coating films which had been elapsed to rains of 63° C. for 50, 100, 150, and 200 hr, were rubbed with a steel wool of #0000 20 times under a load of 200 g to evaluate steel wool resistance. The results are shown in Table 1 below. When a titanium dioxide coating film which has been subjected to Co doping and further treatment with a zinc coupling agent was used, even after the elapse of 200 hr, the steel wool resistance equal to that at the initial stage can be maintained.

Example 2

A coating composition of Example 2 was prepared in quite the same manner as in Example 1, except that, in the preparation of titanium dioxide fine particles, the coating treatment with the inorganic compound, that is, the coating treatment of titanium dioxide with hydrous aluminum oxide, was not carried out. Next, a coating film having a refractive index of 2.00 and a haze value of 0.3 was prepared in the same manner as in Example 1. The coating film thus formed was subjected to a lightfastness test in the same manner as in Example 1. Even after the elapse of 200 hr, the steel wool resistance equal to that of the initial stage could be maintained.

Example 3

A coating composition of Example 3 was prepared in quite the same manner as in Example 1, except that the coating treatment with the anionic polar group-containing organic compound and/or organic metal compound, that is, the coating treatment with stearic acid, was not carried out. Next, a coating film having a refractive index of 1.90 and a haze value of 0.50 was prepared in the same manner as in Example 1. The coating film thus formed was subjected to a lightfastness test in the same manner as in Example 1. Even after the elapse of 200 hr, the steel wool resistance equal to that of the initial stage could be maintained.

Example 4

A coating composition of Example 4 was prepared in quite the same manner as in Example 1, except that, in the preparation of titanium dioxide fine particles, the coating treatment with the inorganic compound, that is, the coating treatment of titanium dioxide with hydrous aluminum oxide, was not carried out and, further, the coating treatment with the anionic polar group-containing organic compound and/or organometal compound, that is, the coating treatment with stearic acid, was not carried out. Next, a coating film having a refractive index of 2.00 and a haze value of 0.50 was prepared in the same manner as in Example 1. The coating film thus formed was subjected to a lightfastness test in the same manner as in Example 1. Even after the elapse of 200 hr, the steel wool resistance equal to that of the initial stage could be maintained.

Example 5

A coating composition for medium-refractive index layer formation having a refractive index of 1.76 of Example 5 was prepared by adding 2.5 parts by weight of dipentaerythritol pentaacrylate (SR399E: tradename, manufactured by Nippon Kayaku Co., Ltd.) to 10 parts by weight of a titanium dioxide dispersion liquid having a refractive index of 1.90 prepared in Example 1. After coating of the coating composition for hardcoat formation described in Example 1 onto a TAC film base material, the coating composition for medium-refractive index layer formation having a refractive index of 1.76 was coated in the same manner as in the high-refractive index layer formation of Example 1 to form a transparent film having a thickness (after curing) of 80 nm. Further, the coating composition for high-refractive index layer formation prepared in Example 1 was coated to a thickness (after curing) of about 60 nm. A low-refractive index layer having a refractive index of 1.4 formed of a silicon-containing polyvinylidene fluoride copolymer was coated onto the high-refractive index layer to a thickness of 90 nm, and the coating was exposed to UV at an exposure of 500 mJ/cm$^2$ to cure the coating.

Figure 4:
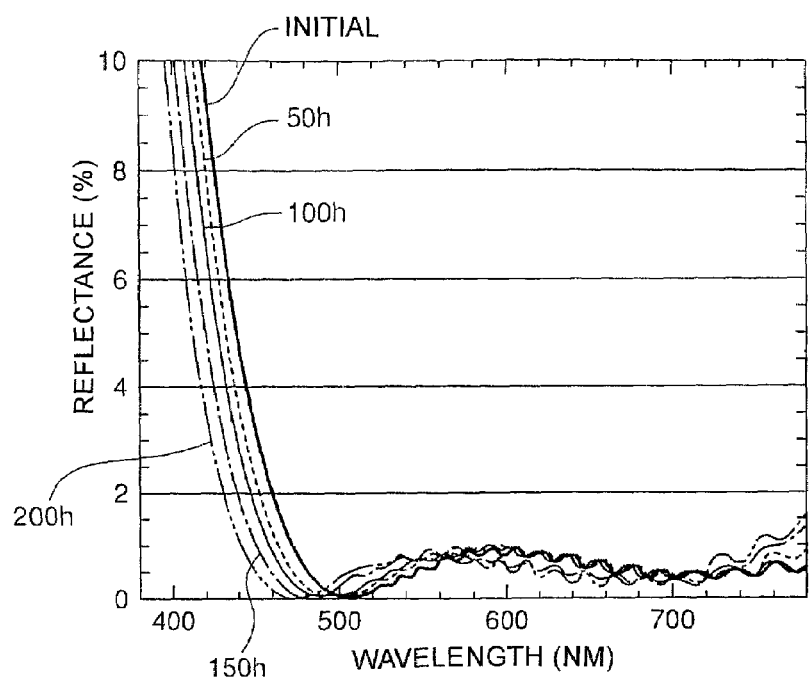
FIG. 4 is a diagram showing a spectral curve of an antireflective film prepared in Example 5.

A spectral curve of the antireflective film thus obtained is shown in FIG. 4. The initial spectral curve shows that low reflection is exhibited over a wide visible region. Further, a lightfastness test was carried out in the same manner as in Example 1. As a result, it was found that, even after the elapse of 200 hr. low reflection was maintained over a wide visible region although the spectral curve was somewhat shifted toward the lower wavelength side.

Comparative Example 1

The procedure of Example 1 was repeated to prepare a coating composition and to form a coating film having a refractive index of 2.00, except that, in order to ensure only the dispersibility of the surface of titanium dioxide, Co was not doped, the surface treatment with $Al_2O_3$ and zinc acetyl acetonate was not carried out, and rutile-type titanium oxide subjected to surface treatment with stearic acid was used. The coating film thus formed was subjected to a lightfastness test in the same manner as in Example 1. A deterioration occurred when 50 hr elapsed.

Comparative Example 2

(1) Preparation of Coating Composition

A coating composition was prepared in the same manner as in Example 1, except that rutile-type titanium oxide (tradename: MT-500HDM, manufactured by Tayca Corporation) having a titanium oxide content of 85 to 90%, subjected to surface treatment with $Al_2O_3$, $ZrO_3$, and a silicone oil, having a primary particle diameter of 30 to 40 nm, having a specific surface area of 30 to 50 m$^2$/g and having a water-repellent surface was provided as rutile-type titanium oxide. A coating film having a refractive index of 1.90 was formed using this coating composition. The coating film was subjected to a lightfastness test in the same manner as in Example 1. The coating film began to deteriorate when 100 hr elapsed; and, when 150 hr elapsed, the coating film was completely separated.

Comparative Example 3

A coating composition of Comparative Example 3 was prepared in quite the same manner as in Example 1, except that, in the preparation of the titanium dioxide fine particles, the treatment with a zinc coupling agent was not carried out. Next, a coating film having a refractive index of 1.90 and a haze value of 0.3 was formed in the same manner as in Example 1. The coating film thus obtained was subjected to a lightfastness test in the same manner as in Example 1. The coating film began to deteriorate when 150 hr elapsed; and, when 200 hr elapsed, a severe damage and separation were observed.

Comparative Example 4

A coating composition for medium-refractive index layer formation having a refractive index of 1.76 was prepared by adding 2.5 parts by weight of dipentaerythritol pentaacrylate (SR399E: tradename, manufactured by Nippon Kayaku Co., Ltd.) to 10 parts by weight of a titanium dioxide dispersion liquid having a refractive index of 1.90 prepared in Comparative Example 2. After coating of the hardcoat component described in Example 1 onto a TAC base material, a medium-refractive index layer having a refractive index of 1.76 was coated in the same manner as in the high-refractive index layer formation of Example 1 to form a transparent film having a thickness (after curing) of 80 nm. Further, a high-refractive index layer having a refractive index of 1.90 formed in Comparative Example 2 was coated onto the medium-refractive index layer to a thickness (after curing) of about 60 nm. A low-refractive index layer having a refractive index of 1.40 formed of a silicon-containing polyvinylidene fluoride copolymer was coated onto the high-refractive index layer to a thickness of 90 nm, and the coating was exposed to UV at an exposure of 500 mJ/cm$^2$ to cure the coating.

Figure 5:
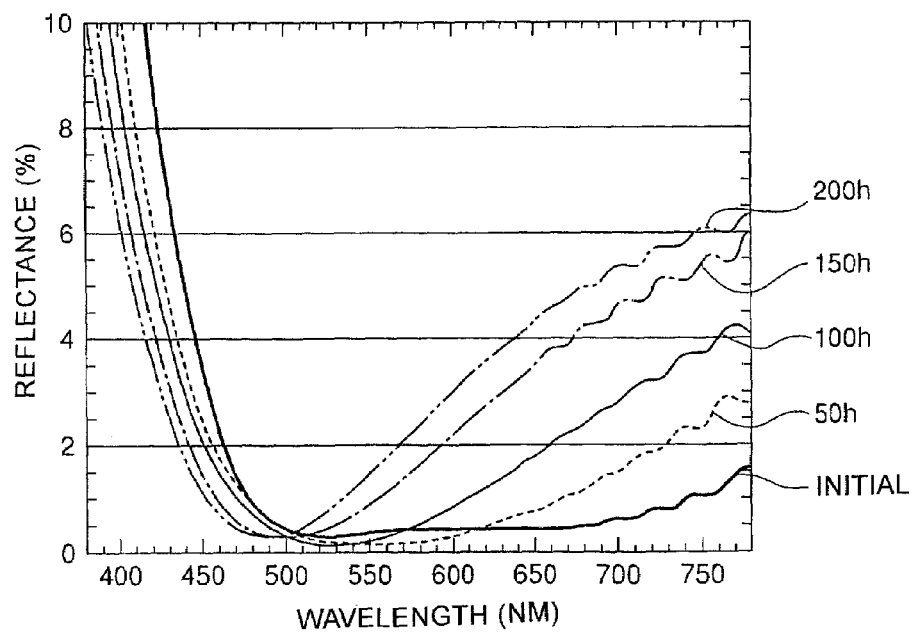
FIG. 5 is a diagram showing a spectral curve of an antireflective film prepared in Comparative Example 3.

A spectral curve for the antireflective film thus obtained is shown in FIG. 5. As can be seen from the initial spectral curve in FIG. 5, as with the coating film formed in Example 2, the film exhibited low reflection over a wide visual region. The results of a lightfastness test conducted in the same manner as in Example 1 show that, from after the elapse of 50 hr, simultaneously with a shift of the spectral curve toward the lower wavelength side, the reflectance toward the higher wavelength side is increased, a V-shaped reflectance curve is formed, and the low reflection over a wide visible region cannot be maintained.

INDUSTRIAL APPLICABILITY

The present invention can provide a coating composition and a coating film formed using the coating composition. More specifically, the present invention can provide a coating composition having improved lightfastness that is suitable for the formation of a layer for constituting an antireflective film for covering the display surface of LCDs, CRTs and the like, particularly a medium- to high-refractive index layer, an antireflective film comprising a layer of a coating film formed using the coating composition, and an image display device onto which the antireflective film has been applied.

The invention claimed is:

1. An antireflective film comprising a coating film formed by curing a coating composition, the coating composition comprising:
   titanium dioxide fine particles with eliminated or reduced photocatalytic activity comprising titanium dioxide fine particles doped with cobalt, and an organometallic zinc compound present on surfaces of the cobalt-doped titanium dioxide fine particles;
   a binder component;
   a dispersant; and
   an organic solvent;
   wherein the organometallic zinc compound is at least one compound selected from the group consisting of zinc acetylacetonate, zinc benzoate, zinc acetate, and zinc 2-ethylhexylate.

2. The antireflective film according to claim 1, wherein the titanium dioxide fine particles with eliminated or reduced photocatalytic activity have a primary particle diameter of 0.01 to 0.1 μm.

3. The antireflective film according to claim 1, wherein the dispersant contains an anionic polar group.

4. The antireflective film according to claim 1, wherein the binder component is ionizing radiation curable.

5. The antireflective film according to claim 1, wherein the organic solvent is a ketone solvent.

6. The antireflective film according to claim 1, wherein the coating composition comprises 10 parts by weight of the titanium dioxide fine particles with eliminated or reduced photocatalytic activity, 4 to 20 parts by weight of the binder component, and 2 to 4 parts by weight of the dispersant.

7. The antireflective laminate according to claim 1, wherein the coating composition comprises 1-hydroxy-cyclohexyl-phenyl-ketone and/or 2-methyl-1-[4-(methylthio)phenyl]-2-morpholinopropan-1-one as a photoinitiator.

8. The antireflective laminate according to claim 1, wherein the organic solvent is contained in an amount of 50 to 99.5 parts by weight based on 0.5 to 50 parts by weight of the total solid content of the coating composition.

9. An antireflective laminate according to claim 1, wherein the coating film has a refractive index of 1.55 to 2.20 when the thickness of the film after curing is 0.05 to 10 μm, and wherein a haze value of the coating film, as measured integrally with a base material according to JIS K 7361-1, is different by not more than 1% from a haze value of the base material.

10. The antireflective film according to claim 1, wherein the antireflective film comprises a laminate of at least two light-transparent layers, wherein the at least two light-transparent layers are transparent to light and are different from each other in refractive index, and wherein at least one of the light-transparent layers is the coating film.

11. An image display device comprising an antireflective film according to claim 1 covering a display surface.

12. An antireflective film comprising a coating film formed by curing a coating composition, the coating composition comprising:
   titanium dioxide fine particles with eliminated or reduced photocatalytic activity comprising titanium dioxide fine particles doped with cobalt, an organometallic zinc compound present on surfaces of the cobalt-doped titanium dioxide fine particles, and a coating layer formed on the organometallic zinc compound and comprising an anionic polar group-containing organic compound and/or organometal compound;
   a binder component
   a dispersant; and
   an organic solvent;
   wherein the organometallic zinc compound is at least one compound selected from the group consisting of zinc acetylacetonate, zinc benzoate, zinc acetate, and zinc 2-ethylhexylate.

13. The antireflective film according to claim 12, wherein the anionic polar group-containing organic compound is an organic carboxylic acid.

14. The antireflective film according to claim 12, wherein the anionic polar group-containing organometal compound is at least one of a silane coupling agent and a titanate coupling agent.

15. An antireflective film comprising a coating film formed by curing a coating composition, the coating composition comprising:
   titanium dioxide fine particles with eliminated or reduced photocatalytic activity comprising titanium dioxide fine particles doped with cobalt, a coating layer formed on surfaces of the cobalt-doped titanium dioxide fine particles and comprising an inorganic compound that reduces or eliminates photocatalytic activity, and an or organometallic zinc compound present on the surface of the coating layer;
a binder component;
a dispersant; and
an organic solvent; and
wherein the organometallic zinc compound is at least one compound selected from the group consisting of zinc acetylacetonate, zinc benzoate, zinc acetate, and zinc 2-ethylhexylate.

16. The antireflective film according to claim 15, wherein the inorganic compound comprises fine particles of at least one metal oxide selected from the group consisting of alumina, silica, zinc oxide, zirconium oxide, tin oxide, antimony-doped tin oxide, and indium-doped tin oxide.

17. An antireflective film comprising a coating film formed by curing a coating composition, the coating composition comprising:
titanium dioxide fine particles with eliminated or reduced photocatalytic activity comprising titanium dioxide fine particles doped with cobalt, a first coating layer formed on surfaces of the cobalt-doped titanium dioxide fine particles and comprising an inorganic compound that educes or eliminates photocatalytic activity, and an organometallic zinc compound present on the surface of the first coating layer, and a second coating layer formed on the organometallic zinc compound and comprising an anionic polar group-containing organic compound and/or organometal compound;
a binder component;
a dispersant; and
an organic solvent; and
wherein the zinc organometallic compound is at least one compound selected from the group consisting of zinc acetylacetonate, zinc benzoate, zinc acetate, and zinc 2-ethylhexylate.

* * * * *